United States Patent [19]

Shinohara et al.

[11] 3,862,089

[45] Jan. 21, 1975

[54] PROCESS FOR THE PREPARATION OF THERMOSETTING PHENOLIC SYNTHETIC RESIN

[75] Inventors: Yoshiyuki Shinohara, Otake; Katuhiko Tasaka, Iwakuni; Kinya Mizui, Otake; Shigeru Katayama, Iwakuni, all of Japan

[73] Assignee: Mitsui Petrochemical Industries, Ltd., Tokyo, Japan

[22] Filed: June 26, 1970

[21] Appl. No.: 50,323

[30] Foreign Application Priority Data
July 5, 1969 Japan.............................. 44-52811
July 5, 1969 Japan.............................. 44-52812

[52] U.S. Cl.................. 260/55, 260/53 R, 260/57, 260/59, 260/38
[51] Int. Cl............................................... C08g 5/00
[58] Field of Search............. 260/57, 51, 59, 55, 53

[56] References Cited
UNITED STATES PATENTS
2,728,797  12/1955  Filar................................... 260/621

FOREIGN PATENTS OR APPLICATIONS
6,814,710  4/1969  Netherlands
1,557,726  2/1969  France
1,801,327  5/1969  Germany

*Primary Examiner*—Howard E. Schain
*Attorney, Agent, or Firm*—Sherman & Shalloway

[57]  ABSTRACT

Process for the preparation of thermosetting resin of excellent physical properties such as dimensional stability under elevated temperature, bending strength, cracking resistance, insulating resistance after boiling and shell mold adaptability, which comprises reacting under heating the residue (R) remaining after recovery by distillation of cresol and acetone from acid-catalyzed cleavage reaction products of cymene hydroperoxide with at least one phenolic compound (P) selected from the group consisting of phenol and cresol, and an aldehyde (A).

9 Claims, No Drawings

PROCESS FOR THE PREPARATION OF THERMOSETTING PHENOLIC SYNTHETIC RESIN

This invention relates to a process for the preparation of thermosetting synthetic resin of excellent physical properties such as dimensional stability under elevated temperatures, bending strength, cracking resistance, and particularly insulating resistance after boiling and shell mold adaptability, utilizing as the starting material the waste of cresol production by cymene process, i.e., the residue remaining after recovery of cresol and acetone from acid-catalyzed cleavage reaction products of cymene hydroperoxide by distillation.

More particularly, the invention relates to a process for the preparation of thermosetting synthetic resin wherein the residue remaining after recovery of cresol and acetone from acid-catalyzed cleavage reaction products of cymene hydroperoxide by distillation is reacted by heating with at least one phenolic compound selected from the group consisting of phenol and cresol, and an aldehyde.

Phenol-aldehyde and cresol-aldehyde type thermosetting synthetic resins have been known of old. It is also known that, when they are condensation-reacted in the presence of acid catalyst (novolak type catalyst), novolak type resin which is hardened as heated with a hardening agent, for example, hexamethylenetetramine, is formed, and if condensation-reacted in the presence of alkali catalyst (resol type catalyst), they form self-hardenable resol type resin which is hardened under heating without any hardening agent.

Whereas, preparation of cresol and acetone by cymene process which comprises oxidizing cymene to form cymene hydroperoxide, cleaving the same by the action of acid catalyst, and recovering from the reaction products cresol and acetone by distillation, is also known in the petrochemical industry.

We intended the utilization of industrial waste of the cresol production by cymene process, i.e., the utilization of the residue after recovery of cresol and acetone by distillation. After extensive research works, we came to believe that said residue contains, besides the minor amount of cresol possibly remaining therein, sideproducts of the formula below:

and mutually reacting substances of above sideproducts with cresol and side-produced formaldehyde. We further discovered that this residue forms resin-like material when reacted with aldehyde in the presence of acid or alkali catalyst, but the resin is of no practical value if an aldehyde alone, such as formaldehyde, is reacted with the residue. Whereas, we found that when the residue is reacted with at least one phenolic compound selected from the group consisting of phenol and cresol, and an aldehyde, thermosetting, synthetic resin having the described excellent properties is obtained.

Furthermore, the resin is found to exhibit markedly better insulating resistance after boiling and shell mold adaptability, compared with heretofore known cresol-aldehyde resin.

Thus not only the problem of disposal of the residue as industrial waste is very favorably solved, but the residue can be converted to valuable articles as resin of excellent properties and low cost.

Accordingly, therefore, the object of the invention is to provide a process for making thermosetting, synthetic resin of excellent properties from the waste residue of cresol production by cymene process, with industrial advantage.

Still many other objects and advantages of the invention will become apparent from the following descriptions.

"Cymene process" for making cresol is well known. According to that process, the liquid oxidation product containing normally approximately 10 – 15 percent by weight of hydroperoxides which is obtained by oxidation of cymene is concentrated, and caused to perform acid-catalyzed clevage in the presence of mineral acid such as sulfuric acid, optionally followed by neutralization with alkali such as alkali hydroxide, alkali carbonate, etc. Then cresol and acetone are recovered from the cleavage reaction products by distillation. In the present invention, the residue of the acid-catalized cleavage reaction products of cymene hydroperoxide, from which cresol and acetone have been recovered by distillation, is utilized as one of the reactants for forming valuable thermosetting, synthetic resin.

Utilization of similar residue, such as that remaining after recovery of phenol and acetone by distillation

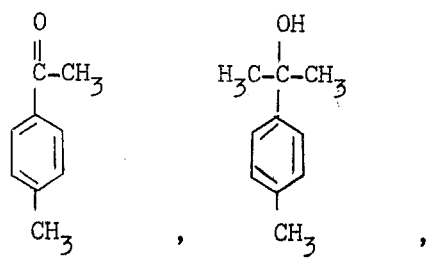

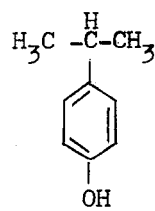

and 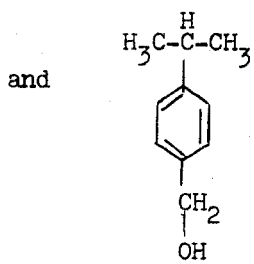

from the acid-catalyzed cleavage reaction products of cumene hydroperoxide, i.e., residue of phenol production by cumene process, may also be considered, but the resinous product shows inferior shell mold adaptability to that of the product of subject process, as demonstrated in later given Control, and therefore is outside the scope of this invention.

The residue utilized in the invention, i.e., that of acid-catalyzed cleavage reaction products of cymene hydroperoxide from which cresol and acetone have been recovered by distillation, consists mainly of the components of higher boiling points than that of cresol, while it may contain the residual minor amount of low boiling point component. Such higher boiling point components comprise methylacetophenone (3 – 10 percent by weight), isopropylbenzyl alcohol (3 – 30 percent by weight), isopropylphenol (5 – 15 percent by weight), cresol (0.5 – 10 percent by weight), unknown material, traces of $\alpha,\alpha$-dimethyl-p-tolylcarbinol, p-isopropylbenzaldehyde, and mutually reacting substances of the foregoing with cresol and side-produced formaldehyde(balance).

According to the invention, not only the fraction of distillate remaining after separation of cresol and acetone from the acid-catalyzed cleavage reaction products of cymene hydroperoxide, but also that remaining after the removal of such components having higher boiling points than that of cresol but which are separable by distillation, can be used as the starting material. The degree of distillation in the latter case, i.e., the type and quantity of the component or components having boiling points higher than that of cresol, which remain in the system, are freely variable according to the intended utility of thermosetting resin, treating capacity of the distillation column, degree of utility of side-products, etc. Presumably those higher boiling point components advantageously affect the properties of thermosetting resin produced in accordance with the subject process. Because, as demonstrated in later given control, if the cymene process cresol production residue utilized in the invention is replaced by cymen process phenol production residue, the excellent shell mold adaptability of the product resin is substantially lost.

Method of recovering useful side-products from the cymene process cresol production residue by distillation, or an attempt to obtain cresol or isopropenyltoluene formed by thermal decomposition of the specified residue are known. However, the former is impractical in that the recovered side-products except methylacetophenone are quantitatively too little, and also in that the isolation and refining of the recovered products are cumbersome and difficult because the residue is a complex multi-components' mixture. Thus the method is very disadvantageous as a utilizing means of industrial waste. Also the latter attempt must be practiced under extremely high temperatures. Furthermore the reaction's selectivity is low and large quantity of pitch-like matter is formed. Thus that method is likewise disadvantageous.

According to the invention, the specified residue is either reacted with at least one phenolic compound selected from the group consisting of phenol and cresol, and an aldehyde, in the presence of a catalyst known as useful for the production of cresol-formaldehyde or phenolformaldehyde resin; or reacted with cresol-formaldehyde or phenol-formaldehyde resin which is prepared in advance in the presence of known catalyst.

As the catalysts, for example, acid catalysts (novolak type catalysts) such as sulfuric, hydrochloric, and p-toluenesulfonic acids, oxalic acid and alkali catalysts (resol type catalysts) such as sodium hydroxide, potassium hydroxide, calcium hydroxide, magnesium hydroxide, and ammonia, may be named.

As the aldehyde, formaldehyde and paraformaldehyde are most commonly used, while acetaldehyde is also usable.

The reaction of cresol or phenol with aldehyde, or the reaction of cresol or phenol with aldehyde in the presence of the residue can progress at the reaction temperatures ranging approximately from 70° – 160°C., in the presence of catalyst as above-described. When alkali catalyst is used, lower temperatures within the feasible range, such as around 70°–100°C. are preferred. After the reaction, the product may be washed with hot water, if required, to be removed of the catalyst, and then concentrated to provide liquid or solid thermosetting, synthetic resin.

The amount of catalyst is suitably variable depending on the type of catalyst, mol ratio of the reactants, etc., but normally the use of approximately 0.5 – 5 percent by weight to the total of the residue and phenolic compound achieves satisfactory result.

According to the subject process, if an acid catalyst is used, the residue (R), phenolic compound (P), and aldehyde (A) are used in such relative quantities as will satisfy the following condition:

(i) the mol number of (A) per 1 g atom of oxygen in the mixture of (R) and (P) is 0.1 – 2, preferably 0.3 – 1.0. If aldehyde is used exceeding the above limitation, the resin is gelatinized and becomes rubber-like, during the condensation reaction, catalyst-removing operation, or the concentrating step, which renders its blending with conventionally employed additives in the preparation of shaped articles of such resin, such as filler, difficult, or renders the formation of homogeneous blend impossible. Furthermore, the performance of shaped articles from the resulting resin is deteriorated, failing to accomplish the object of this invention. Whereas, if excessively minor amount of aldehyde not satisfying the foregoing conditions is used, such defects as undue lowering in softening point of the thermosetting resin, increase in its content of volatile component, and reduction in hardening speed, are caused.

If an alkali catalyst is used in the subject process, the residue (R), phenolic compound (P), and aldehyde (A) are used at such quantitative ratios as will satisfy the condition below:

(ii) the mol number of (A) per 1 g atom of oxygen in the mixture of (R) and (P) is 0.1 – 2.5, preferably 0.9 –2.5. If the quantity of aldehyde is excessively large to (R) plus (P), aldehyde to be recovered increases, causing operational disadvantage. Whereas, if excessively minor quantity of aldehyde below the above lower limit is used, the hardening speed of the resin is reduced, and also the performance of resulting thermosetting resin is degraded.

The subject process can be practiced by supplying all three reactants, i.e., the residue, phenolic compound, and aldehyde, simultaneously to the reaction zone. It is preferred, however, to first cause the reaction of residue with aldehyde, adding the phenolic compound to the reaction system while the reaction is still under progress, or after the reaction has considerably advanced. In practicing the subject process, the suitable quantitative ratio between the residue (R) and the phenolic compound (P) normally ranges, as (R)/(P) by weight, 10/90 – 70/30, preferably 25/75 – 65/35. According to the preferred embodiment, methylacetophenone, isopropylphenol, isopropylbenzyl alcohol, or mutually acting substances of the foregoing with cresol and formalin, which may be contained in the residue, become resinous more readily, attaining satisfactory resin-forming ratio.

The invention can be practiced, furthermore, by first reacting the phenolic compound with aldehyde, and heating the blend of resulting reaction product with the residue, The above embodiment can be effected by mechanical milling of the reaction product and the residue at temperatures ranging approximately from 40° to 160°C., or by hot milling the blend formed in advance, of the reaction product, residue, and other conventional additives such as filler, by such means as, for example, heating roll. In the above embodiment, preferably the residue is that remaining after removal of the greatest parts of distillation-separable side-products such as methylacetophenone, isopropylphenol, etc., besides cresol, acetone, and unreacted cymene. That is, the residue or waste remaining after recovery of distillation-separable fractions of distillate until the waste becomes paste, highly viscous liquid or solid resinous material, is used with preference. Such residue is utilizable also in the previously described embodiment.

Upon elementary analysis, such resinous residue exhibited high oxygen content (approximately 10 percent). It is presumed from the results of infrared spectrum and NMR spectrum analyses that the oxygen is originated from phenolic hydroxyl groups, and that there are approximately two benzene rings per one hydroxyl group. It is also discovered that the solid-resinous residue is itself hardenable under heating with hexamine serving as the hardening agent.

In the latter embodiment, it is preferred to effect the blending and heating at the quantitative ratios of the reactants satisfying the conditions (i) and (ii) given in the foregoing, and furthermore within the range of 40 – 90 parts by weight of the reaction products of the phenolic compound with aldehyde, per 10 – 60 parts by weight of the residue, in 100 parts by weight of total resin. Particularly preferred range is 40 – 70 parts by weight of said reaction product to 30 – 60 parts by weight of the residue.

If the resin is produced in the presence of an acid catalyst in accordance with the invention, it can be hardened with known hardening agents conventionally employed for hardening known cresol-aldehyde novolak type resin, such as hexamethylenetetramine, paraformaldehyde, etc. Also when alkali catalyst is used, use of hardening agent is optional. When used, the amount of hardening agent within conventionally employed range well achieves the purpose, i.e., normally 5 – 20 parts by weight per 100 parts of the resin product is satisfactory.

The thermosetting, synthetic resin produced of the subject process is useful in the fields similar to those wherein conventional cresol-aldehyde resins are used, for example, as the material of shaped articles, laminate, paint, adhesive, binder, etc. Known additives in those fields, such as filler, plasticizer, parting agent, and the like may be added to the resin. As the filler, for example, wood powder, pulp, fabric chip, asbestos, glass fiber, mica, calcium carbonate, cement, and coloring agent may be named. As the parting agents, stearic acid, stearate, paraffine, and the like can be used. As the plasticizer, for example, fulfural tricresylphosphate and synthetic rubber may be named.

Hereinafter the invention will be more specifically explained with reference to working Examples.

EXAMPLE 1 AND CONTROLS 1 AND 2

A viscous, dark brown residue remaining after distillation-recovery of acetone and cresol from acid-catalyzed cleavage reaction products of cymene hydroperoxide was used. The residue contained 9.3 percent of residual cresol, 1.6 percent of methylacetophenone, 9.3 percent of isopropylphenol, 3.1 percent of isopropylbenzyl alcohol, and balance of other side products, the percents being by weight.

100 Parts of the residual ($R$) was reacted with 96 parts of 37 percent formalin ($A$) and 3 parts of conc. hydrochloric acid at 95°C. for 2 hours under stirring, the parts being by weight. At the end of reaction, the conversions of named components were as follows: cresol, 100 percent; methylacetophenone, 17 percent; isopropylphenol, 98 percent; and isopropylbenzyl alcohol, 35 percent. Then 100 parts by weight of phenol ($P$) was added to the system, followed by additional 2 hours' reaction at 95°C. The reaction product was washed with hot water and concentrated to provide 187 parts by weight of a modified resin (m. p. 80°C.; gelation time, 43 seconds; acetone-insolubilizing ratio after hardening, 98 percent).

In the above Example 1, the mol number of ($A$) per 1 g atom of oxygen in the mixture of ($R$) and ($P$) was 0.7.

Incidentally, the gelation time and acetone-insolubilizing ratio after hardening were measured or calculated as follows, the methods applying to the values given in the following Examples and Controls:

Gelation time:

The time required for gelation of 0.5 G of the sample mixed with 15 wt. percent of hexamine, on hot plate of 170°C., was measured by the unit of second.

Acetone-insolubilizing ratio after hardening:

The sample-mixed with 15 wt. percent of hexamine was hardened for an hour in an oil bath of 150°C., and the hardened product was pulverized and extracted with hot acetone. The residual ratio of acetone-insoluble component was expressed by percent by weight.

The properties of the product resin were as shown in Table 1 given below. Also as Control 1, the properties of a cresol-formaldehyde resin (m.p. 96°C., gelation time, 80 seconds; acetone-insolubilizing ratio after hardening, 95 percent) which was obtained by similar reactions as described in Example 1, except that the residue was replaced by 100 parts by weight of cresol (o-cresol, 0.2 percent m-cresol, 60.1 percent; p-cresol, 39.6 percent), the mol ratio of formalin/cresol being same to that in Example 1 (Control 1) are given in the same Table. In Control 2, Example 1 was repeated except that the use of phenol was omitted, and consequently the amount of formalin was charged to 23 parts by weight.

Table 1

|  | Example 1 | Control 1 | Control 2 |
| --- | --- | --- | --- |
| Bending Strength (kg/mm$^2$) | 9.9 | 9.1 | 3.8 |
| Specific Gravity | 1.276 | 1.292 | 1.268 |
| Boiling Water Absorption (%) | 0.46 | 0.55 | 1.36 |
| Insulating Resistance (normal state) ($\Omega$) | $2.2 \times 10^{12}$ | $2.1 \times 10^{12}$ | $2.8 \times 10^{12}$ |
| Insulating Resistance (after boiling) ($\Omega$) | $1.7 \times 10^{12}$ | $0.048 \times 10^{10}$ | $0.15 \times 10^{10}$ |
| Thermal Distortion Temp. (°C.) | 168 | 160 | 135 |

The above-given values were measured as to the molding materials formed by blending 100 parts of the sample resin, 62 parts of wood powder, 11 parts of hexamine, and 0.6 part of calcium stearate, the parts being by weight, followed by preliminary hardening and milling with heated roll of 140°C. The testing methods are in accord with JIS K-6911, except the thermal distortion temperature which was measured in accordance with ASTM D648.547.

CONTROL 3

Example 1 was repeated except that the residue was replaced by equally industrially available residue which was obtained by distillation-recovery of phenol and acetone from the acid-catalyzed cleavage reaction products of cumene hydroperoxide (residual phenol content, 2.5 percent by weight; acetophenone, 18.5 percent by weight, demethylphenyl carbinol, 8.3 percent by weight; $\alpha$-methylstyrene dimer, 20.5 percent by weight; other side-products, balance). Shell mold adaptability of the product resin and of the resin produced by Example 1 was tested, with the results given in Table 2 below.

Table 2

| | Shell Mold Adaptability | | | |
| --- | --- | --- | --- | --- |
| Run. No. | Flexural Strength (kg/cm$^2$) | Permeability (%) | Thermal Expansion Coefficient (at 200°C. %) | Amount of Generated Gas (at 1,200°C. cc/g) |
| Ex. 1 | 60.4 | 125 | 1.21 | 30 |
| Control 3 | 40.3 | 116 | 1.45 | 40 |

The above shell mold adaptability was measured as follows:

3 Parts by weight of a resin sample is added to 100 parts by weight of siliceous sand heated at 150°C. in a kneading mixer to perform the resin coating. Then 0.36 part by weight of hexamethylene-tetramine dissolved in water is added in the system to form coated sand. The coated sand is placed in a mold heated at 250°C. After ten seconds, the superfluous coated sand is taken out by a suitable tool such as a ruler, following which the mold is put into a furnace maintained at 400°C. where the curing is effected for 90 seconds.

Flexural Strength:

The test piece of 4 inch × 1 inch × ¼ inch is prepared and the flexural strength of the test piece is determined according to the method of JIS K-6910. The greater the value is, the better is the property.

Permeability:

The test piece of a disc form having a thickness of 1 inch and a diameter of 2 inch is prepared, and the permeability of the test piece is determined by using a permeability tester of Dietert Co. and calculated by the following formula:

$P = Vh/pAt$ in which

P denotes the permeability,
V denotes the amount passed of air,
A denotes the sectional area of the test piece,
t denotes the time required for air (V) to pass through the test piece,
h denotes the thickness of the test piece, and
p denotes the pressure of air.

The greater the value is, the better is the property.

Thermal expansion coefficient:

A test piece of a disc form of a 2 inch thickness and a 1⅛ inch diameter is prepared. The test piece is taken into a furnace maintained at 1,200°C. and at every interval of the prescribed period of time the amount of the thermal expansion on the dial gauge is read. When the amount of the thermal expansion is constant, the thermal expansion coefficient is calculated, the value being expressed in terms of the amount of the thermal expansion per inch.

The small the value is, the better is the property.

Amount of gas generated:

A test piece (weighing about 10 g) is fixed to a thermograph-attached tester of Dietert Co. and the sample and tester are taken into a furnace maintained at 1,200°C. When formation of the gas is stopped, the amount of the gas formed is measured and the value of the amount of the generated gas is expressed in terms of the amount (cc) per gram of the test piece.

The smaller the value is, the better is the property.

As demonstrated by the test data given in Table 2, the resin produced in accordance with the present invention exhibits greater flexural strength and permeability compared with the case wherein residue of phenol production by cumene process is used, and also less thermal expansion coefficient and amount of gas generated. Consequently the former provides shaped articles of smoother surfaces, containing no internal blowholes or cavities. That is, shellmolded articles of better precision can be formed of the subject resin, and provision of larger size articles is facilitated.

EXAMPLE 2

The same residue as employed in Example 1 was used. One-hundred parts of the residue (R), 100 parts of phenol (P), and 96 parts of 37 percent formalin (A) were all simultaneously reacted in the presence of 3 parts conc. hydrochloric acid as the catalyst, at 95°C. for 2 hours under agitation, the parts being by weight. The mol number of (A) per 1 g atom of oxygen in the mixture of (R) and (P) was 0.7. The conversions to resin of the initially present components after the reaction were as follows: cresol, 100 percent; methylacetophenone, 3 percent; isopropylphenol, 80 percent; isopropylbenzyl alcohol, 25 percent; and phenol, 98 percent. The reaction product was washed with hot water, and concentrated to provide 178 parts by weight of modified resin (m.p. 71°C.; gelation time, 52 seconds; acetone-insolubilizing ratio after hardening, 97 percent).

The results of testing the properties of same resin similarly to Table 1 are shown in later-given Table 3.

EXAMPLE 3 AND CONTROL 4

Acid-catalyzed cleavage reaction product of cymene hydroperoxide was distilled, and acetone and cresol were withdrawn from the top of distillation column. Thus a viscous, dark brown residue was obtained as the waste (residual cresol, 0.8 percent; methylacetophenone, 2.1 percent; isopropylphenol, 11.9 percent; and isopropylbenzyl alcohol, 10.6 percent). One-hundred (100) parts of this residue (R), 100 parts of phenol (P), 96 parts of 37 percent formalin (A), and 3 parts of conc. hydrochloric acid were reacted in the identical manner with Example 2, the parts being by weight. The reaction product was washed with hot water and concentrated to provide 186 parts of modified resin (m.p., 82°C., gelation time, 85 seconds; acetone-insolubilizing ratio after hardening, 95 percent).

In this Example, the mol number $(A)$ per 1 g atom of oxygen in the mixture of $(R)$ and $(P)$ was 0.7.

The properties of thus formed modified resin similarly to Example 1 are shown in Table 3 below. In the same Table, similarly measured properties of a novolak type phenolic resin (m.p., 89°C., gelation time, 40 seconds; acetone-insolubilizing ratio after hardening, 94 percent) obtained by reacting 100 parts of phenol (P), 74.5 parts of 37 percent formalin $(A)$, and 2 parts of conc. hydrochloric acid, at 95°C. for 2 hours, the parts being by weight, and washing with hot water and concentrating the reaction product, are given for comparison (Control 4), together with those of the resin produced in Example 2.

EXAMPLE 4

One-hundred parts of residue $(R)$ in the cresol distillation column employed in Example 2, 96 parts of 37 percent formalin $(A)$, and 2 parts of sodium hydroxide were reacted at 70°C. for 3 hours under stirring and heating, the parts being by weight. Then 100 parts of phenol $(P)$ and 8.2 parts of conc. hydrochloric acid were added to the system, followed by additional 2 hours' reaction at 100°C. The reaction product was washed with water and concentrated to provide 194 parts of solid resin melting at 100°C. The conversions of the components were as follows: phenol, 83 percent; cresol, 100 percent; methylacetophenone, 44 percent; isopropylphenol, 88 percent; and isopropylbenzyl alcohol, 98 percent. The gelation time of the resin was 31 seconds, and acetone-insolubilizing ratio after hardening, 97.5 percent.

In this Example, the mol number of $(A)$ per 1 g atom of oxygen in the mixture $(R)$ and $(P)$ was 0.7.

The properties of the product resin were as shown in given Table 3.

Table 3

|  | Ex. 2 | Ex. 3 | Ex. 4 | Control 4 |
|---|---|---|---|---|
| Bending Strength (kg/mm²) | 9.7 | 9.0 | 10.1 | 9.0 |
| Specific Gravity | 1.281 | 1.280 | 1.282 | 1.321 |
| Boiling Water Absorption (%) | 0.45 | 0.50 | 0.40 | 0.58 |
| Insulating Resistance (normal state) (Ω) | $1.3 \times 10^{12}$ | $2.2 \times 10^{12}$ | $1.4 \times 10^{12}$ | $0.043 \times 10^{12}$ |
| Insulating Resistance (after boiling) (Ω) | $1.6 \times 10^{10}$ | $1.3 \times 10^{10}$ | $2.8 \times 10^{10}$ | $0.07 \times 10^{10}$ |
| Thermal Distortion Temp. (°C.) | 165 | 162 | 172 | 160 |

EXAMPLE 5

One-hundred (100) parts of the residue (R) employed in Example 2, 100 parts of phenol (P), 211 parts of 37 percent formalin (A), and 4.1 parts of sodium hydroxide were reacted at 70°C. for 3 hours, the parts being by weight. The reaction product was neutralized with hydrochloric acid, washed with water, and concentrated under reduced pressure to provide 174 parts by weight of semi-solid resin. In the reaction, the conversions of the initially present components were as follows, as measured by means of gas chromatography: cresol, 100 percent; phenol, 76 percent; methylacetophenone, 50 percent; isopropylphenol, 85 percent; and isopropylbenzyl alcohol, 98 percent. Thus particularly the conversion of methylacetophenone was higher than that in the similar reaction employing acid catalyst. The gelation time of the resin was 77 seconds (without using hexamine), and acetoneinsolubilizing ratio after hardening was 99.5 percent (in the test using no hexamine). This modified resol resin was diluted with methanol into 60 percent varnish, and measured of its properties, with the results as shown in Table 4 below.

In this Example, the mor number of $(A)$ per 1 g atom of oxygen in the mixture of $(R)$ and $(P)$ was 1.5.

Also for comparison, 100 parts of cresol, 90 parts of 37 percent formalin, and 2.1 parts of sodium hydroxide were reacted at 80°C. for an hour under stirring, the parts being by weight. The reaction product was neutralized with hydrochloric acid, washed with water and concentrated under reduced pressure. Thus formed viscous resol type cresol resin was similarly diluted with methanol into 60 percent varnish. The properties of the varnish similarly measured are given in the same Table as of Control 5. ,210

Filter paper (No. 52) for chromatography was immersed in each of the 60 percent methanol varnishes prepared in above Example 5 and Control 5, dried in 100°C. hot air dryer for 15 minutes, and thereafter superposed and molded into laminated plates under a pressure of 150 kg/cm² at 150°C. for 30 minutes. The above properties were measured as to the test pieces formed from the laminated plates in accordance with JIS K 6911. Note, however, that the alkali resistance was determined by immersing the samples for water absorption test in 10 percent aqueous solution of sodium hydroxide at 20°C. for 24 hours, and measuring the weight increase of the samples.

EXAMPLE 6

The acid-catalyzed cleavage reaction product of cymene hydroperoxide was distilled. After the recovery of acetone and cresol, the distillation was further continued until substantially all the fractions of distillate composed of methylacetophenone, isopropylphenol, and isopropylbenzyl alcohol, were distilled off, leaving in the column solid, resinous residue (m.p. 55°C.; gelation time, 15 minutes, acetone-insolubilizing ratio after hardening, 69 percent). To 100 parts of this residue $(R)$, 100 parts of phenol $(P)$, 60.3 parts of 37 percent formalin $(A)$, and 2.6 parts of conc. hydrochloric acid were added and reacted at 95°C. for 2 hours under stirring, the parts being by weight. The reaction product was washed with hot water and concentrated to provide 190 parts by weight of modified resin (m.p., 68°C.; gelation time, 55 seconds; and acetone-insolubilizing ratio after hardening, 88 percent).

In this Example, the mol number of $(A)$ per 1 g atom of oxygen in the mixture of $(R)$ and $(P)$ was 0.42.

One-hundred parts of thus obtained modified resin was blended with 62 parts of wood powder, 11 parts of hexamine and 0.6 part of calcium stearate, the parts being by weight, and the blend was preliminarily hardened and milled by heated roll of 140°C., to provide a molding material. The properties of the material were as in the later-given Table 5.

EXAMPLE 7

To 100 parts of the residue $(R)$ employed in Example 6, 100 parts of cresol $(P)$, 53 parts of 37 percent formalin $(A)$, and 2.5 parts of conc. hydrochloric acid were added and reacted at 95°C. for 2 hours under stirring, the parts being by weight. The reaction product was washed with hot water and concentrated to provide 187 parts by weight of modified resin (m.p. 72°C.; gelation time, 88 seconds; and action-insolubilizing ratio after hardening, 90 percent).

In this Example, the mol number of $(A)$ per 1 g atom of oxygen in the mixture of $(R)$ and $(P)$ was 0.41.

The resin was made a molding material through the blending, preliminary hardening and milling similar to thos practiced in Example 6. The properties of the material are also shown in Table 5.

EXAMPLE 8

To 100 parts of residue $(R)$ employed in Example 6, 50 parts of cresol $(P)$, 50 parts of phenol $(P)$, 57 parts of 37 percent formalin $(A)$, and 2.6 parts of conc. hydrochloric acid were added and reacted at 95°C. for 2 hours under stirring, the parts being by weight. The reaction product was washed with hot water and concentrated to provide 190 parts by weight of a modified resin (m.p. 78°C.; gelation time, 52 seconds; and acetone-insolubilizing ratio after hardening, 97 percent).

In this Example, the mol number of $(A)$ per 1 g atom of oxygen in the mixture of $(R)$ and $(P)$ was 0.42.

The resin was formed into a molding material through the blending, preliminary hardening, and milling similarly to Example 6. The properties of the material were as given in Table 5 below.

Table 5

| Run. No. | Bending Strength (kg/mm$^2$) | Specific Gravity | Boiling Water Absorption (%) | Insulating Resistance ($\Omega$) | | Thermal Distortion Temp. (°C.) |
|---|---|---|---|---|---|---|
| | | | | Normal State | After Boiling | |
| Ex. 6 | 9.5 | 1.275 | 0.46 | 5.0×10$^{12}$ | 1.4×10$^{10}$ | 165 |
| Ex. 7 | 9.1 | 1.245 | 0.50 | 3.2×10$^{12}$ | 1.1×10$^{10}$ | 162 |
| Ex. 8 | 9.3 | 1.269 | 0.43 | 6.8×10$^{12}$ | 2.4×10$^{10}$ | 167 |

EXAMPLES 9, 10 AND CONTROLS 6, 7

The residue of cresol production by cymene process employed in Example 1 was used in the experiments identical withe Example 1, except that the mol number of $(A)$ per 1 g atom of oxygen in the mixture of $(R)$ and $(P)$ were varied in each run. The properties of the resulting resin were as shown in Table 6 below. For comparison, the results of the runs wherein the above mol number of $(A)$ failed to satisfy the condition (i) given in the specification (Controls 6 and 7) are concurrently given in the same table.

Table 6 (Novolak type catalyst)

| Run No. | Mol Number of (A) per 1 g Atom of Oxygen in (R) + (P) | Bending Strength (kg/mm$^2$) | Boiling Water Absorption (%) | Insulating Resistance ($\Omega$) | | Thermal Distortion Temp. (°C) | Flexural Strength (kg/cm$^2$) | Permeability (%) | Shell Mold Adaptability | |
|---|---|---|---|---|---|---|---|---|---|---|
| | | | | Normal State | After Boiling | | | | Thermal Thermal sion Coefficient (%) at 1,200°C. | Amount Amount Generated (cc/g) at 1,200°C. |
| Control 6 | 0.05 | 7.5 | 0.64 | 1.2 × 10$^{11}$ | 0.9 × 10$^9$ | 157 | 45.3 | 128 | 1.22 | 50 |
| Ex. 9 | 0.15 | 9.0 | 0.48 | 2.5 × 10$^{12}$ | 2.0 × 10$^{10}$ | 163 | 62.5 | 126 | 1.21 | 35 |
| Ex. 10 | 1.85 | 8.8 | 0.49 | 1.6 × 10$^{12}$ | 1.5 × 10$^{10}$ | 172 | 67.3 | 123 | 1.22 | 20 |
| Control 7 | 2.15 | — | — | — | — | — | — | — | — | — |

In Control 7, the resin is gelatinized during the condensation reaction.

EXAMPLES 11–12 AND CONTROLS 8–9

Example 5 repeated by varying the amount of 37 percent formalin (A) as indicated in Table 7 to obtain a modified resin. The resulting modified resin was dissolved in methanol to form 50 percent vanish. Using the so formed vanish, a thin laminated plate was prepared in the same manner as in Example 5. Then the properties of the laminated plate were measured with the results shown in Table 7.

Table 7

| | (Resol type Catalyst) | | | | | | | |
|---|---|---|---|---|---|---|---|---|
| | Mol Number of (A) per 1 g | Bending | Tensile | Izod Impact | Water | Insulating Resistance (Ω) | | Alkali |
| Run No. | Atom of Oxygen in (R) + (P) | Strength (kg/mm²) | Strength (kg/mm²) | Strength (kg-cm/mm²) | Absorption (%) | Normal State | After Boiling | Resistance (%) |
| Control 8 | 0.05 | 4.8 | 425.3 | 10.2 | 0.95 | 1.8×10¹⁰ | 0.38×10⁹ | 1.53 |
| Ex. 11 | 0.15 | 12.5 | 720.5 | 14.2 | 0.40 | 2.4×10¹⁰ | 5.5×10⁹ | 0.46 |
| Ex. 12 | 2.5 | 13.0 | 730.7 | 15.5 | 0.48 | 3.0×10¹⁰ | 8.3×10⁹ | 0.45 |
| Control 9 | 3.0 | 8.5 | 715.4 | 13.5 | 0.75 | 2.2×10¹⁰ | 1.5×10⁹ | 0.85 |

EXAMPLES 13–15 AND CONTROL 10–11

One-hundred parts of phenol (P), 74.5 parts of 37 percent formalin (A), and 2 parts of conc. hydrochloric acid as the catalyst, were reacted at 95°C. for 2 hours, the parts being by weight. The reaction product was washed with hot water, and concentrated to provide a novolak type phenolformaldehyde resin (m.p. 89°C.; gelation time, 40 seconds; acetone-insolubilizing ratio after hardening, 94 percent).

The same residue (R) as employed in Example 6 was blended with the above reaction product of (P) with (A), at the blend ratios specified in later given Table 8. Then the total of 100 parts of the resin component (reaction product of (P) with (A), and (R)) was blended with 62 parts of wood powder, 11 parts of hexamine, and 0.6 part of calcium stearate, the parts being by weight, and converted to a molding material by blending and heating with hot roll of 140°C. The material exhibited excellent moldability when shaped with a compression molding machine. The molded articles were tested in accordance with JIS K–6911, with the results as given in Table 8. For comparison, the results of Control 10 wherein the use of residue was omitted, and of Control 11 wherein the use of reaction product of (P) with (A) was omitted, are also given in the same table.

Table 8

| | Blend Ratio (part by weight) | | Mol Number of (A) per 1 g atom of Oxygen in (R) + (P) | Bending Strength (kg/mm²) | Specific Gravity | Boiling Water Absorption (%) | Insulating Resistance (Ω) | | Thermal Distortion Temp. (°C.) |
|---|---|---|---|---|---|---|---|---|---|
| Run No. | (R) | Reaction Product or (P) with (A) | | | | | Normal State | After Boiling | |
| Control 10 | — | 100 | 0.86 | 9.0 | 1.321 | 0.58 | 0.043×10¹² | 0.071×10¹⁰ | 160 |
| Ex. 13 | 60 | 40 | 0.43 | 9.2 | 1.276 | 0.58 | 2.4×10¹² | 0.71×10¹⁰ | 160 |
| Ex. 14 | 50 | 50 | 0.52 | 9.2 | 1.283 | 0.57 | 2.0×10¹² | 0.73×10¹⁰ | 160 |
| Ex. 15 | 30 | 70 | 0.68 | 9.0 | 1.298 | 0.55 | 0.98×10¹² | 0.92×10¹⁰ | 162 |
| Control 11 | 100 | — | 0 | 3.0 | 1.248 | 0.64 | 37.0×10¹² | 0.55×10¹⁰ | 140 |

EXAMPLES 16–18 AND CONTROL 12–13

One-hundred parts of phenol (P), 130 parts of 37 percent formalin (A), and 2.1 parts of sodium hydroxide were reacted for an hour under reflux, the parts being by weight. Thereafter the system was cooled, neutralized with hydrochloric acid, washed with cold water, and vacuumconcentrated to provide 70 parts by weight of a resol type resin.

The same residue (R) as employed in Example 6 was blended and heated with the above reaction product of (A) with (P), at the ratios given in the later-given Table 9. The properties of the product resin were tested similarly to Example 5, with the results shown also in Table 9.

For comparison, the results of Control 12 wherein the use of residue was omitted, and of Control 13 wherein the use of reaction product of (P) with (A) was omitted, are also given in the same table.

The resins prepared of Examples 16 through 18 were easily soluble in methanol, ethanol, acetone, methyl ethyl ketone, methyl isobutyl ketone, etc., and their acetone-insolubilizing ratio after hardening was in all cases 100 percent.

Table 9

| | Blend Ratio (part by weight) | | Mol Number of (A) per 1 g atom of Oxygen in (R) + (P) | Bending Strength (kg/mm²) | Izod Impact Strength (kg-cm/mm²) | Water Absorption (%) | Insulating Resistance (Ω) | | Alkali Resistance (%) |
|---|---|---|---|---|---|---|---|---|---|
| Run No. | (R) | Reaction Product of (P) with (A) | | | | | Normal State | After Boiling | |
| Control 12 | — | 100 | 1.1 | 11.8 | 12.8 | 0.62 | 5.5×10⁹ | 6.0×10⁸ | 1.58 |
| Ex. 16 | 30 | 70 | 0.92 | 14.5 | 15.5 | 0.52 | 1.3×10¹⁰ | 3.5×10⁹ | 0.62 |
| Ex. 17 | 50 | 50 | 0.67 | 13.4 | 15.8 | 0.30 | 1.5×10¹⁰ | 6.8×10⁹ | 0.33 |
| Ex. 18 | 60 | 40 | 0.28 | 12.5 | 14.6 | 0.25 | 1.8×10¹⁰ | 5.2×10⁹ | 0.45 |
| Control 13 | 100 | — | 0 | — | — | — | — | — | — |

In Control 13, the resin is not hardened.

We claim:

1. A process for the preparation of a thermosetting resin which consists essentially of reacting under heating a residue (R) consisting predominantly of compounds of a higher boiling point than cresol remaining after recovery by distillation of cresol and acetone from acid-catalyzed cleavage reaction products of cymene hydroperoxide with at least one phenolic compound (P) selected from the group consisting of phenol and cresol and an aldehyde (A) wherein when an acid catalyst (novalak type catalyst) is used.
   i. the mol number of (A) per 1 g. atom of oxygen in the mixture of (R) and (P) is within the range of 0.1 – 2, and when an alkali catalyst (resol type catalyst) is used.
   ii. the mol number of (A) per 1 g atom of oxygen in the mixture of (R) and (P) is within the range of 0.1 – 2.5, the weight ratio of the residue (R) to the phenolic compound (P), as (R)/(P), being within the range of from 10/90 to 70/30.

2. The process of claim 1, in which the reaction is effected by first reacting the residue with aldehyde, and by adding to the reaction product the specified phenolic compound.

3. The process of claim 1 wherein the reaction is performed at a temperature within the range 70° – 160°C.

4. The process of claim 1, wherein the mol number of (A) as specified in condition is within the range of from 0.3 to 1.0.

5. The process of claim 1, wherein the mole number of (A) as specified in condition (ii) is within the range of from 0.9 to 2.5.

6. The process of claim 1, wherein the reaction is effected by blending and heating the reaction product of the phenolic compound with aldehyde, with said residue.

7. The process of claim 6, wherein the blend ratio of the residue and the reaction product is such that, in 100 parts of total resin, the residue content is within the range of from 10 – 60 parts, and the reaction product content is within the range of from 40 – 90 parts, the parts being by weight.

8. The process of claim 6, wherein the reaction is performed at a temperature within the range of from 40°–160°C.

9. Thermosetting, synthetic resin composition which is formed by incorporating an additive selected from the group consisting of hardening agent, filler, parting agent and plasticizer, with the thermosetting resin obtained through the process of claim 1.

* * * * *